Aug. 5, 1952  E. E. PRATHER  2,605,873
CLUTCH CONTROL MECHANISM

Filed June 18, 1949  2 SHEETS—SHEET 1

INVENTOR
EDWIN E. PRATHER
BY H. O. Clayton
ATTORNEY

Aug. 5, 1952 E. E. PRATHER 2,605,873
CLUTCH CONTROL MECHANISM
Filed June 18, 1949 2 SHEETS—SHEET 2
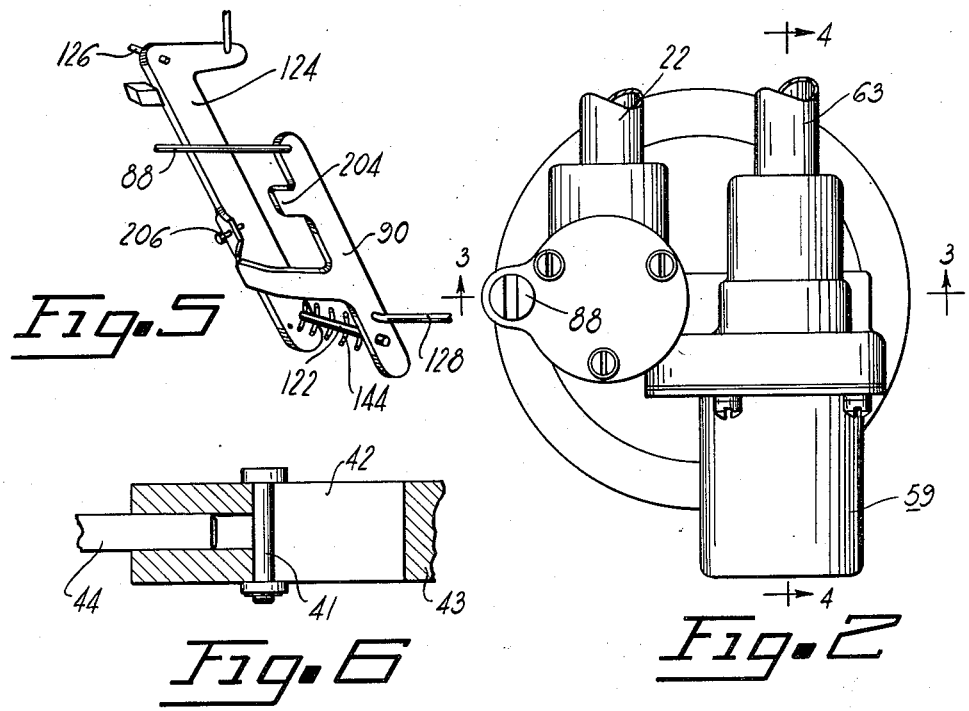
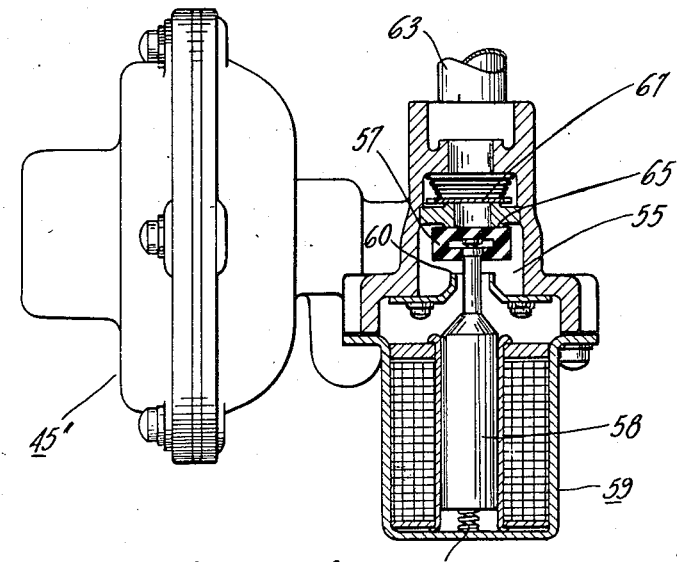
INVENTOR
EDWIN E. PRATHER
BY
ATTORNEY Patented Aug. 5, 1952

2,605,873

UNITED STATES PATENT OFFICE 2,605,873

CLUTCH CONTROL MECHANISM

Edwin E. Prather, South Bend, Ind., assignor to Bendix Aviation Corporation, South Bend, Ind., a corporation of Delaware Application June 18, 1949, Serial No. 99,981

10 Claims. (Cl. 192—.076)

This invention relates in general to power means for operating the friction clutch of an automotive vehicle and in particular to pressure differential operated power means controlled by an operation of the accelerator of the vehicle and by an operation of the engine of the vehicle.

One of the principal objects of my invention is to provide a clutch control mechanism including a pressure differential operated motor controlled by valve mechanism including a three-way pressure balanced follow-up valve which is operative in accordance with the position of the accelerator and the speed of the engine.

Another object of my invention is to provide, in the power plant of an automotive vehicle including a friction clutch, a change speed transmission and an accelerator, a vacuum operated stage type of clutch control mechanism comprising a single acting motor, said motor being controlled by a pressure balanced three-way valve which is controlled, through the intermediary of a floating lever, by the accelerator and power means including a plurality of pressure differential and spring operated motors, the operation of one of said motors being controlled by means including an engine operated water pump.

Yet another object of my invention is to provide power means for operating the friction clutch of an automotive vehicle said power means serving to effect two stages of clutch engaging movement of the driven element of the clutch as it moves into engagement with the driving element of the clutch said two stage operation of the clutch driven element being effected by a throttle opening movement of the accelerator and by engine speed controlled means.

Yet another object of my invention is to provide, in the power plant of an automotive vehicle including a friction clutch, an accelerator and a three speeds forward and reverse transmission, power means for operating the clutch including a pressure differential operated motor operatively connected to the clutch, valve means for controlling the operation of said motor including a three-way valve controlled by a vehicle speed responsive governor, the accelerator and the change speed transmission, and further including another three-way valve controlled by the accelerator and a plurality of pressure differential operated motors; said power means being operative to disengage the clutch by the release of the accelerator when the transmission is established in any gear except high gear and also operative to disengage the clutch, when the transmission is established in high gear, by an operation of the governor and the accelerator.

Yet another object of my invention is to provide a clutch control mechanism adapted to be used in the power plant of an automotive vehicle, said mechanism including a pressure differential operated motor controlled by valve mechanism which is automatically operative to effect a clutch plate loading operation of the clutch control mechanism the degree of loading being dependent upon factors including the position of the accelerator and the speed of the engine of the vehicle.

A further object of my invention is to provide power means for operating the friction clutch of an automotive vehicle the clutch engaging operation of the power means, up to a point where the clutch plates contact with each other with a slight load being controlled by an operation of the accelerator pedal of the vehicle, the remainder of the engaging operation of the clutch, that is the clutch loading operation, being controlled by means operative in accordance with the speed of the engine. The latter means preferably includes an engine driven water pump.

Yet another object of my invention is to provide a pressure differential operated motor for controlling the operation of the friction clutch of an automotive vehicle said motor being controlled by a pressure balanced valve actuated by a power operated floating lever. The valve is operated by the lever to effect a smooth clutch engaging operation of the motor the loading of the clutch plates, after the initial contact thereof being directly proportional to the speed of the engine.

The above and other objects and features of the invention will appear more fully hereinafter from a consideration of the following description taken in connection with the accompanying drawings wherein one embodiment of the invention is illustrated by way of example.

Figure 2 is a plan view looking at one end of the valve mechanism of my invention;

Figure 4 is a view partly in section, taken on the line 4—4 of Figure 2 disclosing details of the solenoid operated vacuum cut-in valve of the valve mechanism;

Figure 5 is a view disclosing the principal parts of the connection interconnecting the accelerator, the throttle and the control valve; and Figure 6 is a view disclosing details of the lost motion connection interconnecting the accelerator operated linkage and the valve.

Figure 1:
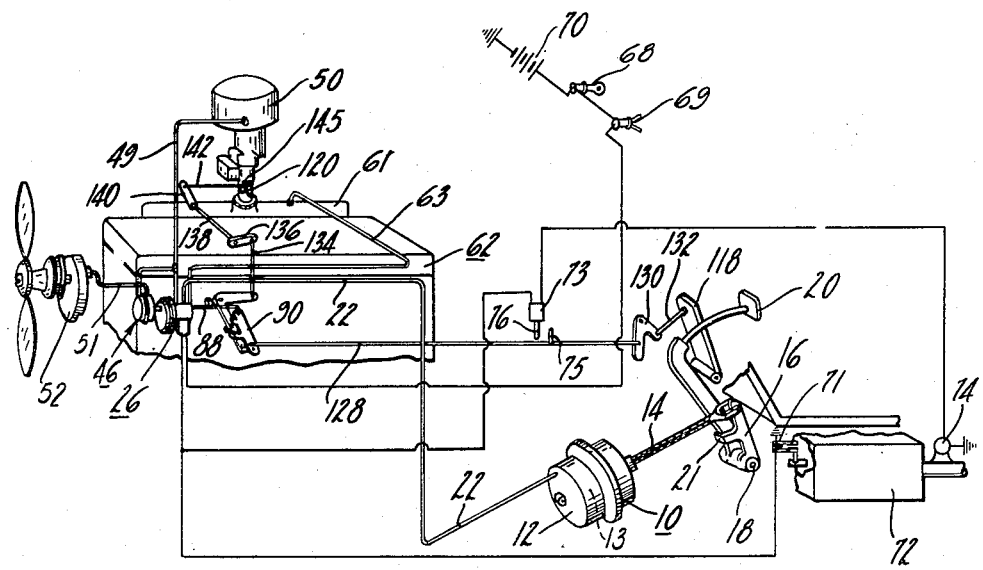
Figure 1 is a diagrammatic view disclosing the clutch control mechanism constituting my invention.

Describing now that embodiment of my invention disclosed in Figures 1 to 5 inclusive of the drawings, the principal elements thereof consist of a single acting vacuum motor 10 comprising a casing 12 and a power element such as a piston, not shown, which is connected to a friction clutch, not shown, of a conventional design. Such a clutch preferably includes driving and driven friction members one of said members being biased into engagement with the other by spring means. One end of the casing of the motor, a portion of the body thereof and the power element together outline a control chamber 13, the gaseous pressure within said chamber being controlled to control the operation of the motor. The force transmitting means interconnecting the power element of the motor with the clutch preferably includes a flexible cable 14 connected to a crank 16; and said crank is fixedly connected to a shaft 18 which is connected to the clutch. A foot operated clutch pedal 20, contactable with a flange 21 extending from the crank 16, is also preferably included in the clutch operating mechanism. The connection between the pedal 20 and the crank 16 provides a means for effecting a manual operation of the clutch; and the lost motion connection between the pedal 20 and crank 16 makes possible a power operation of the clutch without moving the clutch pedal.

Figure 3:
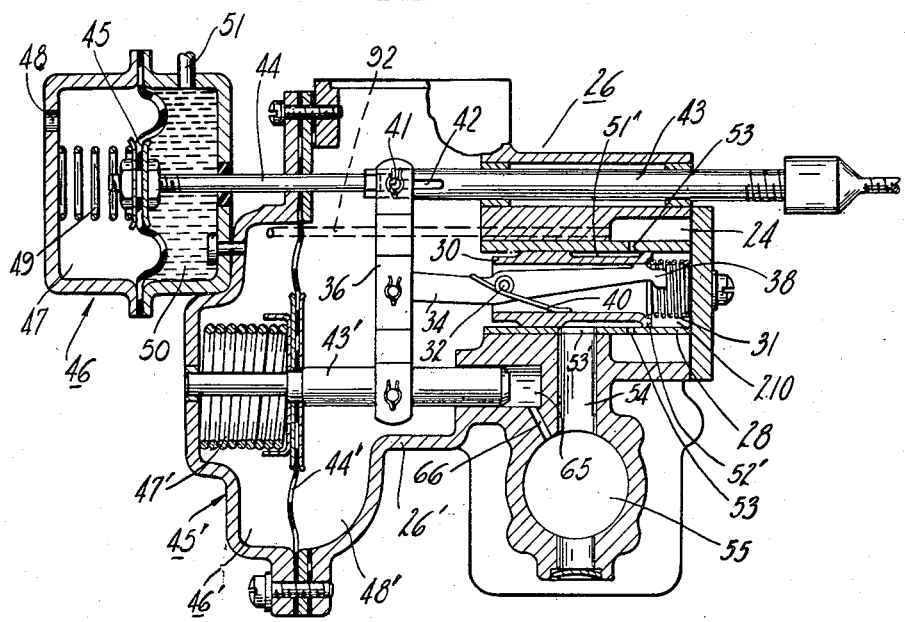
Figure 3 is a longitudinal sectional view, taken on the line 3—3 of Figure 2, of the control valve mechanism constituting the principal feature of my invention.

One end of the motor 10, that is the end of the same constituting a part of the aforementioned power compartment 13 of the motor, is connected by a conduit 22 to a compartment 24 of a control valve unit indicated as a whole by the reference numeral 26 and three different views of said unit are disclosed in Figures 2 to 4 inclusive. The casing 26' of the unit 26 is provided with a cylindrically shaped bore to receive a cylindrical sleeve valve member 28 constituting one of the two parts of a three-way valve; and said casing is counterbored to provide the aforementioned compartment 24, Figure 3.

A reciprocable valve member 30, which is biased inwardly by a preloaded spring 31 and which is provided with a cylindrically shaped bore to permit the passage of air therethrough, constitutes the other part of the two part pressure balanced three-way valve. One end of the latter valve member is provided with diametrically spaced openings to receive therethrough a pin 32 and said pin extends through a connecting pin 34, one end of which extends within the member 30. The other end of the pin 34 extends beyond the valve member 30 and is detachably and pivotally connected to a two-part floating lever 36. The end portion 38 of the pin 34 is preferably biased into engagement with the interior of the valve 30 by a coil spring 40. There is thus provided means for readily disconnecting valve 30 from the lever 36; for the pin 32 may be removed by driving the same through the pin 34, thereby separating the latter from the valve 30.

As is disclosed in Figures 3 and 6 the lever 36 is pivotally connected at one of its ends to a pin 41, which extends through a slot 42 in a rod 43 actuated by the accelerator 118 of the car. There is thus provided a lost motion connection between the accelerator operated rod 43 and the valve operating lever 36. The rod 43 and other accelerator operated linkage connected thereto serve as a manually operated stop means for controlling the spring actuated valve member 30; and said rod and linkage serve as force transmitting means when the accelerator is released to disengage the clutch. The rod 43 is bored in its end portion, Figure 6, to telescopically receive one end of a rod 44 connected at its other end to a piston 45 of a valve operating fluid pressure and spring operated motor 46; and this motor is preferably mounted on the casing of the control valve unit 26. The rod 44 serves as a power operated stop member for controlling the movement of the lever 36. One end of the motor 46, constituting a compartment 47, is vented to the atmosphere at 48 and within this compartment there is positioned a spring 49 having a certain rate, say 14 pounds per inch. The other end of the motor 46 outlines a compartment 50 which receives a power fluid, preferably water; and this compartment is connected by a conduit 51 to the high pressure side of a water pump 52 preferably driven by the internal combustion engine 62 of the vehicle. It follows therefore that the fluid within the compartment 50 exerts a pressure upon the piston 45 which is directly proportional to the speed of the engine. If desired the pump 52 may constitute a part of the cooling system of the power plant of the vehicle. The lower end of the lever 36 is pivotally connected to a pin 43' which is slidably received at one of its ends in a portion of the valve casing and which is secured at its other end to a flexible diaphragm 44'. This diaphragm constitutes the power element of a valve operating spring and pressure differential operated motor indicated as a whole by the reference numeral 45'; and the operation of said motor is in large measure controlled by the gaseous pressure within the control compartment 46' of said motor and by a compression spring 47' within said compartment. A compartment 48' of the motor 45' is vented to the atmosphere via a conduit 49' which leads to an air cleaner 50', Figure 2.

Continuing the description of the valve mechanism 26, the valve member 30 is recessed at 51' and the end of said member provides a land portion 52' which is adapted, in the operation of the valve, to be positioned to register the recess 51' with ports 53 in the valve member 28. The member 30 is also operated so that the land portion 52' covers the ports 53, that is, laps the valve; and said member is also operated to interconnect said ports with the air cleaner 50' via the compartment 48' and the interior of the valve.

The valve member 28 is provided with an opening 53' to register with one end of a duct 54 in the valve casing, said duct registering at its other end with a chamber 55 of a three-way vacuum cut-in valve indicated as a whole by the reference numeral 56 and disclosed in detail in Figure 4. The latter valve includes a valve member 57 secured to one end of an armature 58 of a solenoid 59. When the solenoid 59 is energized the valve member 57 moves downwardly, Figure 4, to seat at 60, thereby connecting the duct 54 with the intake manifold 61 of the internal combustion engine 62 of the vehicle via a conduit 63 and the aforementioned chamber 55; and when the solenoid 59 is de-energized, a spring 64 serves to move the armature upwardly, Figure 4, to seat the valve member 57 at 65, thereby cutting off the vacuum connection and venting the duct 54 to the atmosphere via the air cleaner 50, chamber 48' of the motor 45', a recess 65 in the valve casing which houses the outer end of the pin 43', a duct 66 in the valve casing, and the chamber 55. A spring loaded check valve 67 may be included in the vacuum connection between the intake manifold and the valve chamber 55 thereby providing a means for maintaining the clutch disengaged in the event the conduit 63 is broken when the motor 10 is energized.

Completing the description of the valve unit 26 the casing 26' is provided with a duct 92, Figure 3, permanently interconnecting the control compartment 46 of the motor 45 with the aforementioned valve compartment 24. There is thus provided fluid transmitting means for at all times interconnecting the motor compartment 46', the valve compartment 24, and the control compartment 13 of the clutch operating motor 10. It follows therefore that the operation of the clutch control mechanism constituting my invention is, in part, controlled by controlling the gaseous pressure within the valve compartment 24.

There is thus provided a compact valve control unit 26 comprising a multi-sectioned casing housing a three-way pressure balanced control valve 28, 30 and means for operating said valve comprising the spring 31, the spring and fluid pressure motors 45 and 46, and an accelerator operated rod 43, said rod and the power elements 44' and 45 of the motors being connected with the movable part 30 of said valve by means of a floating lever member 36.

Describing now the force transmitting means interconnecting the accelerator 118 of the car with a throttle operating crank 120 and with the valve operating rod 43, said rod is connected to a rod 88 and this rod is pivotally connected with a lever member 90. The lower end of this lever member is pivotally mounted upon a floating pin 122 and one end of this pin is mounted in one end of a bell crank lever 124 which is pivotally mounted upon a fixed pin 126. The lever member 90 is connected to the accelerator 118 by means of a rod 128, a bell crank lever 130 and a link 132 all as disclosed in Figure 1; and as disclosed in the latter figure, the bell crank lever 124 is connected to the throttle valve of the carburetor by means of a link 134, a crank 136, a rod 138, a crank 140, a link 142 and the crank 120. A lost motion spring 144, which is weaker than a throttle return spring 145 and stronger than the valve spring 31 is operative, together with the spring 145, to return the accelerator to its throttle closed position and to move the valve member 30 to the right, Figure 3, to open the three-way valve 28, 30, that is operated the same to effect a clutch disengaging operation of the motor 10. The spring 144 is preferably sleeved over the pin 122 and is connected at its ends to the levers 90 and 124. The operation of this part of the mechanism of my invention will be described in greater detail hereinafter when the operation of the entire clutch control mechanism is described in detail.

Describing now one of the features of my invention, the solenoid 59 which operates the vacuum cut-in valve 56, is controlled by the electrical controls disclosed in Figure 1. Describing this mechanism a grounded battery 70 is wired in series with an ignition switch 68, a clutch control cutout switch 69 preferably mounted in the instrument panel of the vehicle, the solenoid 59, and a grounded switch 71 which is opened by the second and high gear shift rail of a three speeds forward and reverse transmission 72 when the transmission is established in its high gear setting. With this electrical hookup the valve 56 is opened, that is, the valve member 57 is seated at 60, when the switches 68 and 69 are closed and the transmission is established in any gear except high gear; accordingly, with the vacuum cut-in valve opened there is provided a source of vacuum to make possible a clutch disengaging operation of the motor 10 when the accelerator is released to open the valve 28, 30 an operation which is described in detail hereinafter. The clutch control mechanism of my invention is not, however, limited to use with a three speeds forward and reverse transmission; for other types of transmission mechanisms may be used.

With the vehicle traveling in high gear it is desirable to automatically disengage the clutch when the accelerator is released and the speed of the vehicle is appreciably reduced, for example when the vehicle is being driven very slowly in traffic or in a funeral procession; and to effect this operation of the mechanism of my invention there is provided a switch 73 which is closed when the accelerator is released to close the throttle, and a grounded switch 74 which is operated by a vehicle speed responsive governor, not shown. To effect the operation of the switch 73 there is provided a flange 75 on the rod 128, said flange being contactable with a switch operated member 76.

As is disclosed in Figure 1 the switches 74 and 73 are electrically connected in series in an electrical circuit which is wired in parallel with the grounded transmission operated switch 71. Preferably the switch 73 is so constructed and so operated by the flange 75 that the same is closed just prior to the complete closing of the throttle valve; and it follows, therefore, that the switch 73 is not opened until after the throttle has been opened to a limited degree.

Describing now the complete operation of the mechanism constituting my invention and incidentally completing the description of the parts thereof not heretofore described, when the accelerator 118 is completely released to idle the internal combustion engine 114 and move the lever 90 to the position disclosed in Figure 5, the intake manifold 112 of said engine is partially evacuated. There is thus provided a source of vacuum for energizing the motor 10 to disengage the friction clutch of the motor vehicle; and this operation is effected inasmuch as with the release of the accelerator the movable three-way valve member 30 is moved to place said motor in air transmitting connection with the manifold. The valve member 30 and the means for operating the same then assume the relative positions disclosed in Figures 3 and 6, the lost motion spring 144 serving to compress the valve spring 31 and return the accelerator to its off position, and the spring 47' being compressed by the operation of the power element 44' which is at the time subjected to differentials of pressure developed by the idling engine. Air is then withdrawn from the clutch motor and the motor compartment 46' into the intake manifold via the conduit 63, the valve compartment 55, the duct 54 interconnecting the compartment 55 with the port 53', Figure 3, recess 51', ports 53, the compartment 24, the duct 92 interconnecting the compartment 24 with the valve motor compartment 46', and the conduit 22 interconnecting the compartment 24 with the control chamber of the clutch motor 10.

The compartment 46' being then partially evacuated the diaphragm 44' is moved, by the differential of pressures acting on the same, to the position disclosed in Figure 3; for the gaseous pressure within the compartment 46' is at this time the same as that within the intake manifold of the idling engine and this gaseous pressure is of course the same as that within the control compartment of the then energized clutch operating motor 10. It is to be noted that in the clutch disengaged position of the parts of the mechanism the valve member 30 is moved to the position disclosed in Figure 3 that is a position just short of a closing off of the ports 53 by the flanged end of said valve member, that is, the land 52'; and the stop rod 44 assumes the position disclosed in Figures 3 and 6, that is the end thereof is spaced from the pin 41. This space may be varied by varying the connection between the rod 44 and the diaphragm 45.

Now it is to be noted that the air transmitting connection with the intake manifold is made possible by virtue of the fact that the valve member 57 of the vacuum cut-in valve unit 56 is at the time removed from a seat 65; for the solenoid 59 which actuates said valve member is at the time energized to move the armature 58 and the valve member 57 connected thereto downwardly, Figure 4. Explaining this operation the solenoid 59 is at this time energized by virtue of a closing of the grounded breaker switch 74; for inasmuch as the car is at a standstill the vehicle speed responsive governor, not shown, is then operative to close said switch. The governor is so constructed that when the vehicle is at a standstill or is traveling below a relatively low speed, say ten miles per hour, then the governor is operative to close the grounded switch 74 thus completing an electrical circuit including the switch 74, the then closed accelerator operated switch 73, the solenoid 59, the cutout switch 69, the ignition switch 63 of the vehicle and the grounded battery 70.

Continuing now the description of the cycle of clutch control operations of the motor 10, said motor having been energized to disengage the clutch the driver will then probably wish to establish the change speed transmission of the vehicle in a relatively low gear setting. This is, of course, done by moving the transmission controlling selector lever, not shown, to its low gear position.

Continuing now the description of the cycle of operations of the clutch control mechanism, the power plant of the vehicle is now prepared to effect a forward movement of the vehicle accordingly the driver depresses the accelerator to open the throttle and effect a clutch engaging operation of the clutch operating power means. Describing the latter operation with the first increment of movement of the accelerator the lever 90 is rotated counterclockwise about the pin 122 as a fulcrum, this operation being made possible by virtue of the fact that the spring 144 is weaker than the throttle spring 145 and the latter spring is strong enough to prevent the rotation of the lever 124. In this operation the lever 90 moves counterclockwise until a flange 204 at the upper end of the same contacts an adjustable stop 206 on the lever 124; and this movement of the lever 90 results in a movement of the rod 88 to the left, Figure 3, to make possible a rotation of the lever member 36 about its pivotal connection with the rod 43 as a fulcrum. The latter operation is effected by the expansion of the spring 31. The valve member 30 is thus moved to the left, Figure 3, the lever 36 operating as a lever of the second class to place the valve ports 53 in communication with a valve chamber 210 which chamber is at all times connected to the atmosphere via the interior of the valve member 30 and the valve compartment 48' which is vented to the atmosphere via the air cleaner 50. It is to be noted that in this initial operation of the valve the degree of movement of the valve member 30 is greater, preferably about twice as great, as the degree of movement of the rod 128 connected to the accelerator. As will be brought out in the description that follows there is thus provided a valve operating mechanism operative to quickly effect the first stage operation of the motor 10 during the first increment of depression of the accelerator, said increment being relatively small; and it is to be remembered that there is a slight opening of the throttle during this movement of the accelerator.

The valve member 30 having been moved to the left to vent the valve compartment 24 to atmosphere there results a relatively rapid flow of air into both the control compartment 13 of the clutch operating motor 10 and the compartment 46' of the valve operating motor 45'; and this flow of air results in a clutch engaging operation of the motor 10. Describing this operation the power element of the motor 10 is moved to the right, Figure 1, by the clutch springs and when said springs have expanded sufficiently to bring the clutch plates into a slight engagement with each other, the movement of the power element is arrested.

Explaining this arresting operation the clutch springs, by their expansion, serve to maintain a relatively low gaseous pressure, that is vacuum, within the control chamber 13 of the motor 10. Now inasmuch as said control chamber is at all times connected to the valve chamber 24 and motor chamber 46' it follows that the gaseous pressure within said chambers is also maintained relatively low by virtue of the expansion of the clutch springs. As described above, when the clutch springs have expanded a certain amount, that is, when their vacuum creating power has decreased to a certain factor, then the spring 47' expands to the right, Figure 3, thereby lapping the three-way valve 28, 30. Describing this operation of said valve the valve member 30 moves to the right until the ports 53 register with the land portion 52' of said valve member; and when this occurs the flow of air into the chamber 46' and the motor 10 is automatically cut off and the system is then in equilibrium.

In this operation the lever 90 rotates counterclockwise about the pivotal connection between the pin 122 and said lever, said pivotal connection acting as a fulcrum. The parts of the mechanism of my invention are so constructed and arranged, particularly the length of the rods and other force transmitting members, the strength of the clutch springs, the area of the diaphragm 44 and the rates of the springs 47 and 31, that the valve is balanced, that is lapped, to arrest the movement of the power element of the clutch motor when the clutch plates are in slight engagement with each other the throttle being at the time slightly opened.

The parts of the mechanism are also so constructed and arranged that when the above described first stage movement of the pin 41 is completed or just about to be completed, said pin is in abutment with or just short of abutment with the motor operated stop 44. In other words pin 41 moves into contact or just short of contact with the stop 44 just as the first stage movement of the rod 43 is completed.

This clutch engaging operation of the motor 10 is usually described as the first stage operation thereof and it is to be particularly noted that by adjusting the parts of the mechanism that the termination of the first stage operation of the motor may be varied. In other words there is provided means for varying the degree of loading of the clutch plates when the first stage of clutch engaging operation of the motor 10 is completed. It is to be noted that the mechanism of my invention is preferably so constructed that this first stage of clutch engaging operation of said motor is completed at substantially the same time as the opening of the throttle is initiated and as a result of a relatively small degree of depression of the accelerator. This first stage operation of the motor 10 is completed very quickly and with a normal operation of the accelerator the driver may momentarily arrest the depression thereof when the resistance of the throttle return spring 145 is encountered; and this momentary arresting of the depression of the accelerator will suffice to insure a completion of the aforementioned first stage of clutch engaging operation of said motor before the throttle is substantially opened.

To effect the step by step second stage of clutch engaging operation of the motor 10 the driver continues the depression of the accelerator thereby effecting a clockwise rotation of the bell crank lever 124 to further open the throttle; and this operation of the accelerator serves to increase the speed of the engine thereby increasing the pressure of the water in the motor compartment 50. The latter operation results in a compression of the spring 49 thereby permitting a leftward movement of the stop rod 44 by the expansion of the spring 31, the degree of said movement being directly proportional to the speed of the engine. The spring 49 is preferably of such a rate and the cooperating parts of the mechanism are so constructed that said spring is not compressed, to make possible a leftward movement of the rod 44 under the load of the piston 45, until the engine speed exceeds a certain critical factor said factor being in large measure controlled by the above mentioned slight opening of the throttle; and when this speed has been exceeded, the factor of speed depending upon the degree of opening of the throttle, the pressure of the water upon the diaphragm 45 is sufficient to move the stop 44 to the left thereby again permitting the valve spring 31 to actuate the valve 30 to vent the motor 10 to the atmosphere. The resulting increase in gaseous pressure in the motor compartment 13 and in the valve compartment 46' results in an increase in the loading of the clutch plates followed by a lapping or balancing of the valve 30 the latter operation being described above.

The clutch engaging operation of the mechanism may be repeated until the desired engagement of the clutch and opening of the throttle is effected; as would be the operation when the driver is parking the car.

There is thus provided, by the clutch control mechanism of my invention, means for automatically disengaging the clutch when the accelerator is released, the vehicle at the time travelling below governor speed and the transmission being established in a high gear setting; furthermore, the mechanism is operative to disengage the clutch when the accelerator is released and the transmission is established in a low gear or reverse gear setting. The essence of my invention, however, lies in the means for controlling the engagement of the clutch the loading of the clutch plates, after the same have been engaged slightly at a slight opening of the throttle, being directly proportional to the speed of the engine. There is thus provided a clutch control mechanism wherein the engagement of the clutch is directly proportional to the driving torque of the engine thereby effecting the desired acceleration of the vehicle. In effecting this operation with the mechanism of my invention, the accelerator, the valve spring 31 and the motor 45' cooperate, at a certain position of the accelerator, to effect the first stage of clutch engaging operation of the mechanism; and the water motor 46 then takes over the control to effect the step by step second stage clutch engaging operation of the mechanism the pin 41 then moving freely in the slot 42 as the accelerator is depressed to speed up the engine.

Although only one embodiment of the invention has been illustrated and described, various changes in the form and relative arrangements of the parts may be made to suit requirements.

I claim:

1. Clutch control mechanism adapted to be included in the power plant of an automotive vehicle including a fluid pressure motor, valve means for controlling the operation of said motor comprising a three-way valve mechanism including a movable member, said member, when operated in a certain direction, serving to connect the motor with a source of the fluid pressure to effect a clutch disengaging operation of the motor and when operated in another direction serving to vent the motor to the atmosphere to effect a clutch engaging operation of the motor, together with means for actuating the movable valve member including a floating lever member, and means for actuating the lever member and for controlling the operation thereof to effect an operation of the valve member including a spring member operable to bias the valve member in a certain direction and further including a plurality of separate power means and a foot operated member.

2. Clutch control mechanism adapted to be included in the power plant of an automotive vehicle including a fluid pressure motor, valve means for controlling the operation of said motor comprising a three-way valve mechanism including a movable member, said member, when operated in one direction, serving to connect the motor with a source of the fluid pressure to effect a clutch disengaging operation of the motor and when operated in another direction serving to vent the motor to the atmosphere to effect a clutch engaging operation of the motor; together with means for actuating the movable valve member including a floating lever, and means for actuating and controlling the operation of the lever to effect an operation of the valve mechanism including a spring operative to move the valve member in one direction, a plurality of stop means operative to control the movement of one end of tthe lever in one direction, and power means operative to control the movement of the other end of the lever member.

3. Clutch control mechanism adapted to be included in the power plant of an automotive vehicle including a fluid pressure motor, valve means for controlling the operation of said motor to effect a clutch disengaging operation thereof and to effect a stage clutch engaging operation thereof including a reciprocable valve member, means for actuating and controlling the actuation of said member including a spring operative to bias the valve member in a certain direction, power means operative as a stop means to control the degree of movement of the valve member in the aforementioned direction, another power means operative to control the movement of the valve member in one direction of its movement, and foot operated means, operative, as a stop and as a force transmitting means, to control the movement of the valve member in one or the other of both of its directions of movement.

4. Clutch control mechanism adapted to be included in the power plant of an automotive vehicle comprising an accelerator and an engine, said mechanism including a fluid pressure motor, valve means for controlling the operation of said motor including a pressure balanced valve member, and means for actuating said valve member including means adapted to be actuated by the accelerator of the vehicle, means operable in accordance with the speed of the engine of the vehicle, and means operable in accordance with the gaseous pressure within the motor.

5. Clutch control mechanism adapted to be included in the power plant of an automotive vehicle comprising an accelerator, said mechanism including a fluid pressure motor, valve means for controlling the operation of said motor including a pressure balanced valve member, and means for actuating said valve member including linkage adapted to be actuated by the accelerator of the vehicle and further including a plurality of spring and fluid pressure motors, and a spring operable to bias the valve member in a certain direction.

6. Clutch control mechanism adapted to be included in the power plant of an automotive vehicle comprising an accelerator and an engine, said mechanism including a fluid pressure motor, valve means for controlling the operation of said motor including a pressure balanced valve member and means for actuating and controlling the actuation of said member including means actuated by the accelerator of the vehicle and further including a fluid pressure and spring operated motor operable in accordance with the speed of the engine of the vehicle.

7. Clutch control mechanism adapted to be included in the power plant of an automotive vehicle including a fluid pressure motor, valve means for controlling the operation of said motor to effect a clutch disengaging operation thereof and to effect a stage clutch engaging operation thereof including a reciprocable valve member, means for actuating and controlling the actuation of said member including a spring operative to bias the valve member in a certain direction, power means, including a spring and pressure differential operated motor, operative as a stop means to control the aforementioned operation of the spring, another power means, including a spring and pressure differential operated motor, operative to control the movement of the valve member in one of its directions of movement, and foot operated means, operative both as a stop and as a force transmitting means, for controlling the movement of the valve member in one or the other of both of its directions of movement.

8. Clutch control mechanism adapted to be included in the power plant of an automotive vehicle including a fluid pressure motor, valve means for controlling the operation of said motor to effect a clutch disengaging operation thereof and to effect a stage clutch engaging operation thereof including a reciprocable valve member, means for actuating and controlling the actuation of said member including a spring operative to bias the valve member in a certain direction, a lever operably connected to the valve member, and means for actuating and controlling the actuation of the lever including a pressure differential and spring operated motor operably connected to one end of the lever, together with a pressure differential and spring operated motor and foot operated force transmitting and stop means, for controlling the movement of the other end of the lever.

9. Clutch control mechanism adapted to be included in the power plant of an automotive vehicle including a fluid pressure motor, valve means for controlling the operation of said motor to effect a clutch disengaging operation thereof and to effect a stage clutch engaging operation thereof including a reciprocable valve member, means for actuating and controlling the actuation of said member including a spring operative to bias the valve member in a certain direction, a floating lever connected to the valve member, and means for actuating and controlling the actuation of the lever to control the operation of the valve mechanism including manually operated means operably connected to one end of the lever said means serving as a force transmitting means to effect a clutch disengaging operation of the valve member and serving as a stop means to control a clutch engaging operation of the valve member under a load exerted by the spring, said lever actuating and controlling means further including a stop member for controlling the clutch engaging operation of the valve member by virtue of the load exerted by the spring, a pressure differential and spring operated motor for actuating the latter stop member, and a pressure differential and spring operated motor operably connected to the other end of the lever and operable to control the clutch engaging operation of the valve member.

10. Clutch control mechanism adapted to be included in the power plant of an automotive vehicle including a fluid pressure motor, valve means for controlling the operation of said motor to effect a clutch disengaging operation thereof and to effect a stage clutch engaging operation thereof including a reciprocable valve member, means for actuating and controlling the actuation of said member including a spring operative to bias the valve member in a certain direction, a floating lever operably connected with the valve member, together with means, cooperating with the spring, for actuating and controlling the actuation of the lever including a spring and pressure differential operated motor, a rod, operative as a stop, secured to the power element of the latter motor and operative to control the position of one end of the lever in controlling the operation of the valve, foot operated means, operative both as a stop and as a force transmitting means, for controlling the position of the aforementioned lever in controlling the operation of the valve, and another spring and pressure differential operated motor operative to control the position of the other end of the lever member in controlling the operation of the valve.

EDWIN E. PRATHER.

REFERENCES CITED

The following references are of record in the file of this patent:

UNITED STATES PATENTS

| Number | Name | Date |
|---|---|---|
| 1,964,693 | Hill | June 26, 1934 |
| 2,296,282 | Hruska | Sept. 22, 1942 |
| 2,365,470 | Ingres | Dec. 19, 1944 |